(12) United States Patent
Wells et al.

(10) Patent No.: US 7,980,048 B1
(45) Date of Patent: Jul. 19, 2011

(54) MECHANISM FOR HARVESTING TOBACCO PLANTS IN SLOTTED RAILS

(75) Inventors: Larry G. Wells, Lexington, KY (US); George B. Day, V, Lexington, KY (US); Timothy D. Smith, Lexington, KY (US); Ira J. Ross, Versailles, KY (US)

(73) Assignee: DRSW, LLC, Lexington, KY (US)

(*) Notice: Subject to any disclaimer, the term of this patent is extended or adjusted under 35 U.S.C. 154(b) by 272 days.

(21) Appl. No.: 12/210,517

(22) Filed: Sep. 15, 2008

Related U.S. Application Data

(60) Provisional application No. 60/972,520, filed on Sep. 14, 2007.

(51) Int. Cl.
*A01D 45/16* (2006.01)
(52) U.S. Cl. .......................................... 56/27.5
(58) Field of Classification Search ............... 56/3, 13.5, 56/13.9, 14.1–14.3, 14.5, 16.4 R, 27.5, 121.4, 56/121.41, 121.43–121.46, 153, 178, 179, 56/185, DIG. 9; 198/415, 620, 624, 626.1; 414/796.5, 796.9, 797.3, 26
See application file for complete search history.

(56) References Cited

U.S. PATENT DOCUMENTS

| | | | |
|---|---|---|---|
| 2,742,163 A * | 4/1956 | Michaux, Jr. .................... | 414/26 |
| 2,785,919 A * | 3/1957 | Grondzik ........................ | 294/5.5 |
| 3,229,831 A * | 1/1966 | Long .............................. | 414/508 |
| 3,610,391 A * | 10/1971 | Beck .............................. | 198/562 |
| 4,178,745 A * | 12/1979 | Wilson ........................... | 56/27.5 |
| 4,273,235 A * | 6/1981 | Rustand ..................... | 198/370.07 |
| 4,444,001 A * | 4/1984 | Thurnau et al. ................. | 56/27.5 |
| 4,510,740 A * | 4/1985 | Foster ............................. | 56/27.5 |
| 4,726,175 A | 2/1988 | Day et al. | |
| 4,790,334 A | 12/1988 | Day et al. | |
| 4,813,216 A | 3/1989 | Day et al. | |
| 5,203,150 A * | 4/1993 | Ryken et al. .................... | 56/16.3 |
| 5,454,217 A * | 10/1995 | Williamson ..................... | 56/27.5 |
| 6,561,752 B2 * | 5/2003 | Vincent et al. ............. | 414/796.9 |

OTHER PUBLICATIONS

Camenisch et al., A Reduced-Cost Mechanized System for Handling and Curing mechanically-Harvested Burley Tobacco, Applied Engineering in Agriculture, 2002, vol. 18(2), pp. 161-169, American Society of Agricultural Engineers.
Wells et al., Automated Harvesting of Burley Tobacco, I. System Development, Transactions of the ASAE, 1990, vol. 33, No. 4, pp. 1033-1037, American Society of Agricultural Engineers, St. Joseph, MI.
Wells et al., Automated Harvesting of Burley Tobacco, II. Evaluation of System Performance, Transactions of the ASAE, 1990, vol. 33, No. 4, pp. 1038-1042, American Society of Agricultural Engineers, St. Joseph, MI.
Bridges et al., Optimum Crop Sizes for Selected Burley Tobacco Harvesting Systems, Tobacco Science, 1997, vol. 41, pp. 10-17.

* cited by examiner

*Primary Examiner* — Thomas B Will
*Assistant Examiner* — Mai Nguyen
(74) *Attorney, Agent, or Firm* — Stites & Harbison, PLLC; Jeffrey A. Haeberlin

(57) ABSTRACT

A mechanism for harvesting tobacco plants includes a magazine of rails. Each rail is elongated and hollow, with a slot along a bottom portion of each rail. Two opposing dispensing conveyors each engage opposing ends of each rails for advancing an empty rail to a filling position. Two opposing notching conveyors grasps the plants and cuts notches into the plants on opposing sides of the plant. A single roller chain stepping conveyor moves the plants from the opposing notching conveyors into a rail in the filling position. The two opposing dispensing conveyors advance the rail filled with plants. An unloading conveyor having opposing roller chains receives the rails filled with plants, collects a group of filled rails, and unloads the group of filled rails on a ground level at a linear speed equal to a forward speed of the harvesting mechanism.

8 Claims, 15 Drawing Sheets

MECHANISM FOR HARVESTING TOBACCO PLANTS IN SLOTTED RAILS

CROSS-REFERENCE TO RELATED APPLICATIONS

This application claims the benefit of U.S. Provisional Patent Application No. 60/972,520, filed Sep. 14, 2007, the entire disclosure of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to a mechanism for harvesting tobacco plants in slotted rails.

2. Background Art

Automated tobacco harvesters, such as the one developed by the present inventors and disclosed in U.S. Pat. No. 4,813,216 (the '216 patent), entitled Apparatus and Method for Automated Tobacco Harvesting, issued on Mar. 21, 1989, have improved on the method of manually harvesting tobacco plants. The harvester described in the '216 patent is designed so as to carefully handle and manipulate the burley plants and thus reduce leaf losses during cutting and storing to a level previously only achievable by the most skilled manual laborers. The harvester is fully mechanized. It includes a system for cutting the plants adjacent the ground. The plants are then conveyed upwardly and inverted through 180 degrees so that the leaves of the plants fall naturally along the stalks. The stalks of the plants are then notched for suspension on a series of slotted tubes in a rectangular curing frame. A suitable curing frame is disclosed in U.S. Pat. No. 4,790,334 (the '334 patent), issued Dec. 13, 1988, also to the present inventors.

The cost of the frames disclosed in the '334 patent, however, can be prohibitive for most tobacco growers. Further, a specialized mechanized vehicle for handling the frames is typically required, adding to the cost. Lastly, debris from the plants being notched at the notching mechanism can interrupt the harvester.

Thus, there is a need for a harvesting mechanism that overcomes these needs and others by suspending tobacco plants in individual rails not requiring a supporting frame, by being able to use any readily available power source, such as a tractor, and by having a notching mechanism that allows any debris to be readily removed.

BRIEF SUMMARY OF THE INVENTION

The present invention provides a harvesting mechanism and a method for harvesting tobacco plants.

In accordance with embodiments of the invention, an exemplary harvesting mechanism includes: a magazine of rails, each rail being elongated and hollow, with a slot along a bottom portion of the rail, and opposing ends; two opposing dispensing conveyors each engaging each opposing end of each rail in a top row of rails from the magazine of rails for advancing an empty rail to a filling position; two opposing notching conveyors, each of the opposing notching conveyors having links for grasping the plants, and each of the opposing notching conveyors having a stack of rotating blades for cutting notches into the plants on opposing sides of the plant; a single roller chain stepping conveyor with tine attachments for moving the plants from the opposing notching conveyors into a rail in the filling position in alignment with the single roller chain stepping conveyor; the two opposing dispensing conveyors also advance the rail filled with plants; and an unloading conveyor having opposing roller chains for receiving rails filled with plants advanced by the two opposing dispensing conveyors, for collecting a group of filled rails, and for unloading the group of filled rails onto the ground at a linear speed equal to a forward speed of the harvesting mechanism.

More specifically described, one of the opposing notching conveyors also pivots with respect to a fulcrum to facilitate debris removal and a linear actuator means also cause one of the opposing notching conveyors to pivot with respect to the fulcrum. Further, the linear actuator means can be either a hydraulic, pneumatic, or electrical assembly.

According to one aspect of the invention, the other of the opposing notching conveyors also pivots with respect to another fulcrum.

More specifically described, the harvesting mechanism further includes two parallel thin members spaced apart and one of the two parallel thin members being operably connected to the one of the opposing notching conveyors for supporting the plants after the plants exit the opposing notching conveyors, the one of the two parallel thin members pivoting with the one of the opposing notching conveyors.

According to another aspect of the invention, the magazine also has opposing magazine bottom end portions and further includes an elevating conveyor having opposing pairs of vertical roller chains each joined by a solid member which supports each bottom end of the magazine of rails, wherein when a row of rails has been removed from the top of the magazine of rails, the two opposing dispensing conveyors pivot outward, the elevating conveyor lifts the magazine of rails a distance equal to a height of one row of rails, and the two opposing dispensing conveyors pivot inward to engage each end of each rail in the top row of rails.

More specifically described, the dispensing conveyor also lifts the top row of rails from the row of rails beneath the top row of rails. Finally, the harvesting mechanism is mounted to and propelled by a tractor.

In accordance with another embodiment of the invention, an exemplary method of harvesting tobacco plants includes the steps of: loading a magazine of rails, each rail being elongated and hollow, with opposing ends and a slot along a bottom portion of the rail; dispensing one of the rails to a filling position by two opposing dispensing conveyors each engaging each of the opposing ends of a plurality of rails from the magazine of rails; loading a plurality of tobacco plants into one of the rails at the filling position; collecting a loaded rail in an unloading conveyor; continuing dispensing one of the rails to the filling position, loading tobacco plants into one of the rails at the filling position, and collecting loaded rails in the unloading conveyor, until a desired number of loaded rails have been collected; and unloading the desired number of collected loaded rails.

According to one aspect of the invention, the magazine has opposing magazine bottom end portions, a top row of rails, a plurality of rows of rails under the top row of rails, and an elevating conveyor having opposing pairs of vertical roller chains each joined by a solid member which supports each opposing magazine bottom end portions, when the top row of rails has been removed, the two opposing dispensing conveyors pivot outward, the elevating conveyor lifts the magazine of rails a distance equal to a height of one row of rails and the two opposing dispensing conveyors pivot inward to engage each end of each rail in a new top row of rails.

According to another aspect of the invention, the magazine has opposing magazine bottom end portions, a top row of rails, a plurality of rows of rails under the top row of rails, and an elevating conveyor having opposing pairs of vertical roller chains each joined by a solid member which supports each opposing magazine bottom end portions, wherein when the top row of rails has been removed, the two opposing dispensing conveyors pivot outward, the elevating conveyor lifts the magazine of rails a distance equal to a height of one row of rails, and the two opposing dispensing conveyors pivot inward to engage and lift upwards each end of each rail in a new top row of rails.

According to yet another aspect of the invention, the method further includes opposing notching conveyors, each of the opposing notching conveyors also has links for grasping the plants, each of the opposing notching conveyors has a stack of rotating blades for notching the tobacco plants on opposing sides of the tobacco plant, and further including the steps of notching the tobacco plants on opposing sides of the tobacco plants prior to loading the plurality of tobacco plants into one of the rails at the filling position, and pivoting one of the opposing notching conveyors with respect to a fulcrum to facilitate debris removal.

According to yet another aspect of the invention, the method further includes the step of pivoting the other of the opposing notching conveyors with respect to another fulcrum.

BRIEF DESCRIPTION OF THE SEVERAL VIEWS OF THE DRAWINGS

These and other features, aspects, and advantages of the present invention will become better understood with regard to the following description, appended claims, and accompanying drawings where:

DETAILED DESCRIPTION OF EXEMPLARY EMBODIMENTS OF THE INVENTION

Figure 1:
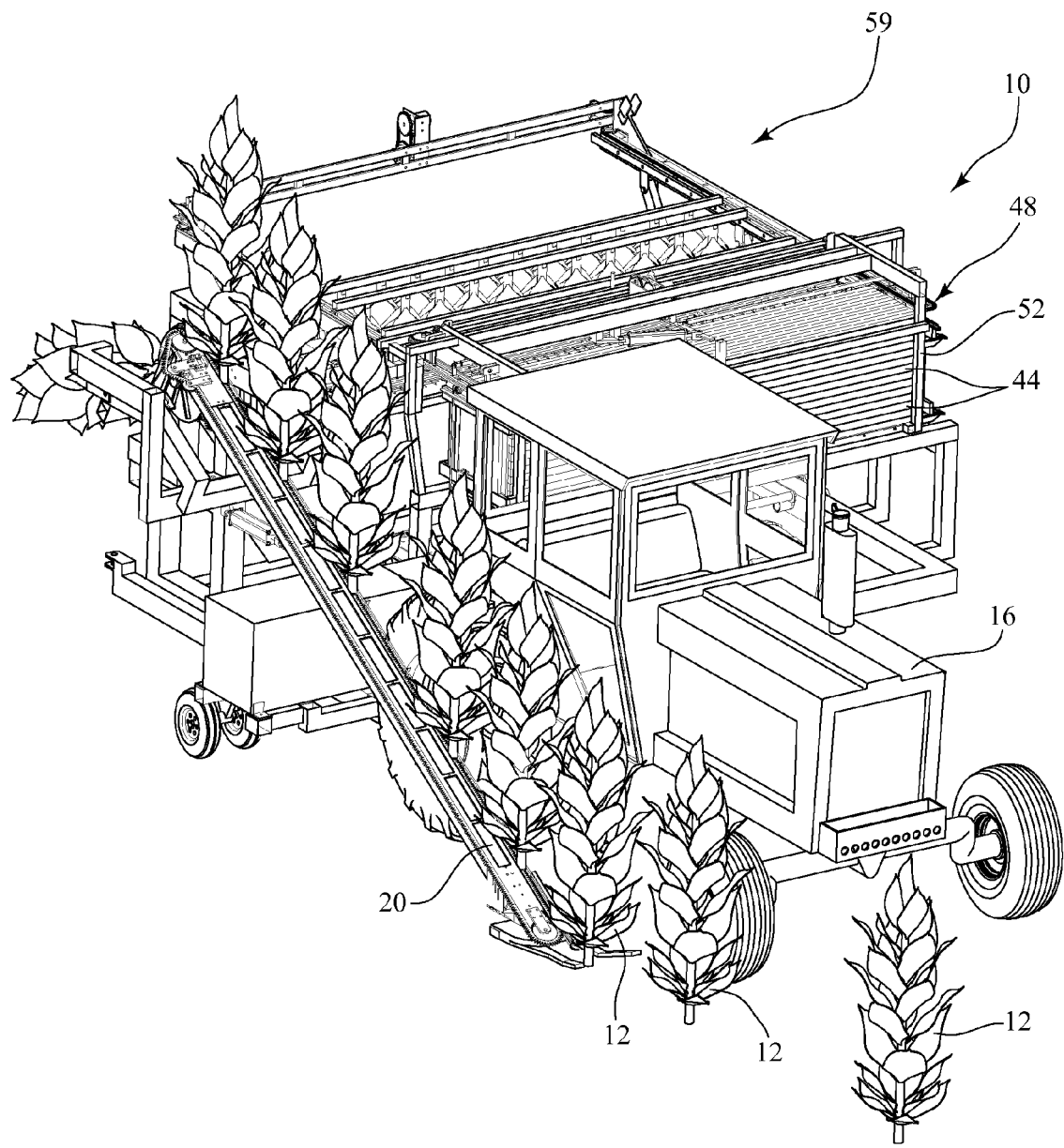
FIG. 1 is a perspective view of an embodiment of a tobacco harvesting mechanism harvesting tobacco plants made in accordance with the present invention.
Figure 2:
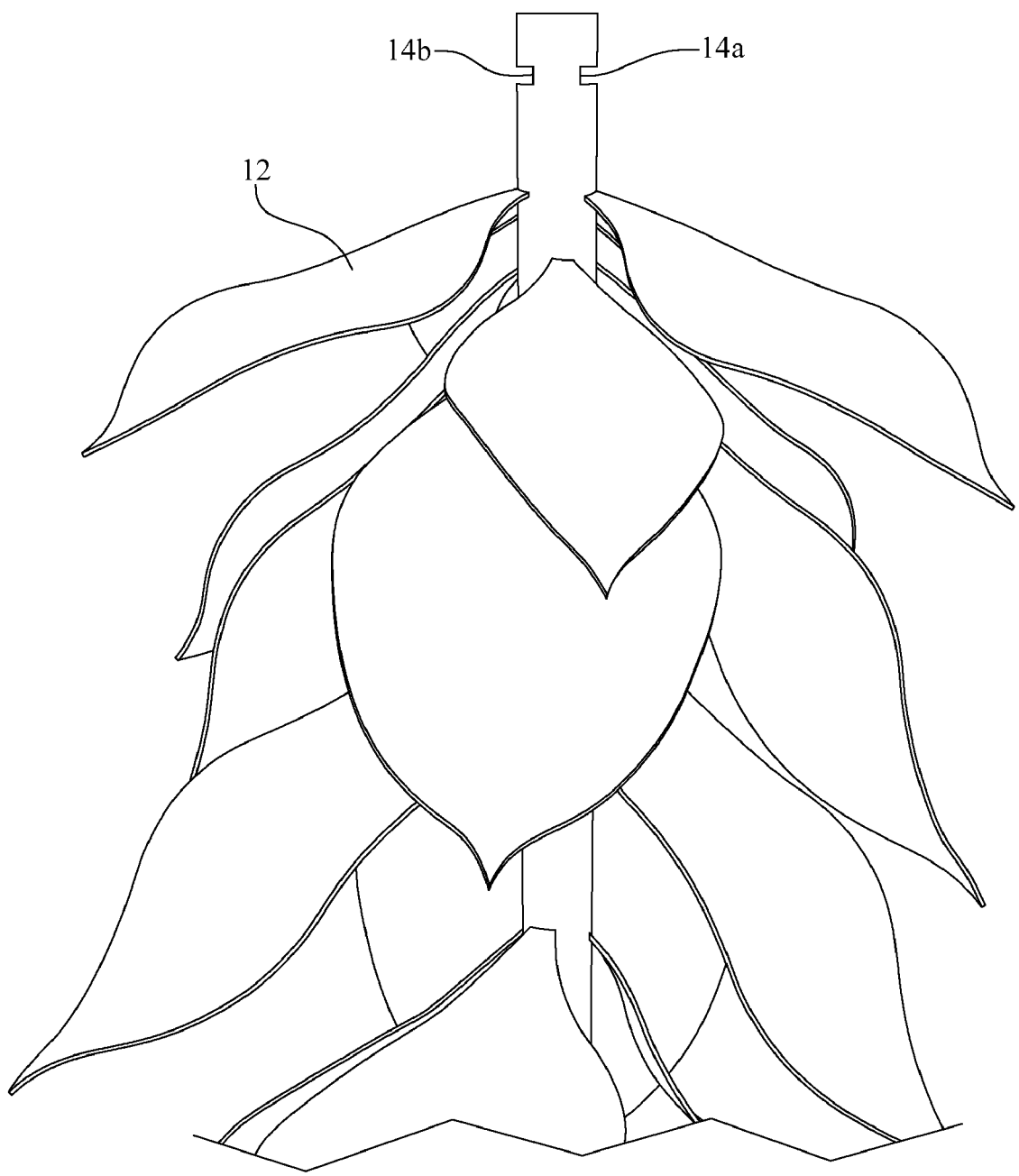
FIG. 2 is a perspective view of a tobacco plant cut with notches by the tobacco harvesting mechanism of FIG. 1.

FIG. 1 shows an exemplary mechanism for harvesting tobacco plants by means of slotted steel rails or receivers. The harvesting mechanism 10 detaches tobacco plants 12 at near ground level, elevates them by means of an inclined conveyor, inverts them and cuts opposing notches 14a, 14b near the base of the plant (see FIG. 2). U.S. Pat. No. 4,813,216, titled Apparatus and Method for Automated Tobacco Harvesting, discloses an exemplary harvesting mechanism for the steps of detaching, elevating, and inverting the tobacco plants, and is incorporated herein by reference. Described herein are improved systems and methods for notching the tobacco plants and for placing notched plants into independent slotted rails or receivers that are not joined by or affixed to any other structure. Then, the rails or receivers containing plants can be retrieved, transported, and placed onto supporting structures for drying and curing.

Remaining in FIG. 1, the exemplary harvesting mechanism 10 is shown mounted to and propelled by a tractor 16. It should be noted that the harvesting mechanism 10 could be self propelled or supported and propelled by an alternate mobile power unit. The harvesting mechanism 10 accomplishes the functions of cutting, elevating, and inverting plants by mechanisms similar to those described in U.S. Pat. No. 4,813,216. A rotating saw (not shown) cuts plants 12 as the plants 12 are engaged by the of tines of an inclined conveyor 20 and subsequently travel up an inclined conveyor 20.

Figure 3:
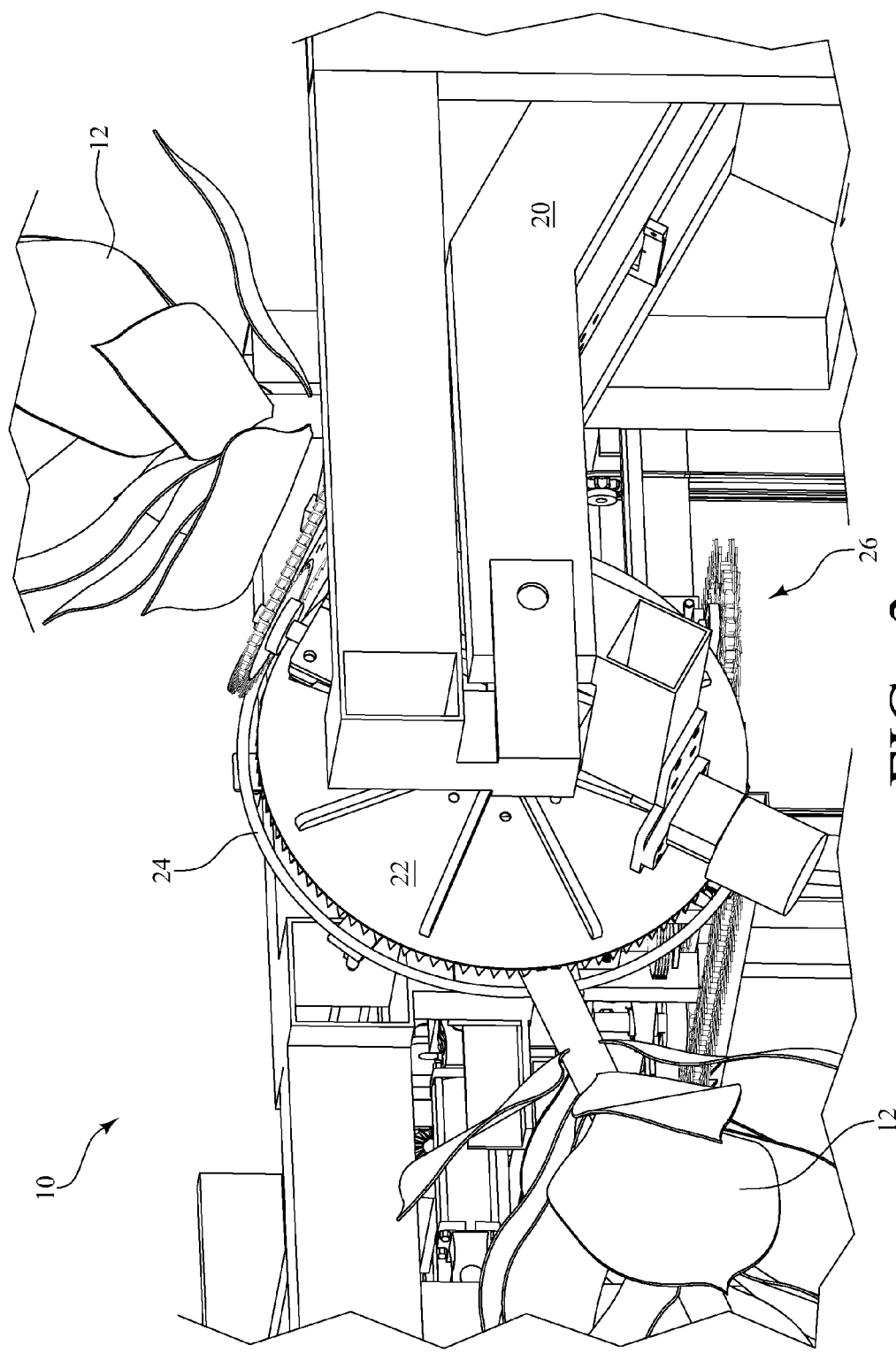
FIG. 3 is a partial perspective view of a tobacco plant in an inverting conveyor of the tobacco harvesting mechanism of FIG. 1.

As shown in FIG. 3, as the plants 12 travel to the top of the inclined conveyor 20, a portion of the plants 12 is trapped between a inversion or rotating disk 22 and a circular guide 24. The guide 24 remains stationary as the plants 12 are inverted with and by movement of the rotating disk 22. The guide 24 and rotating disk 22 sends the plants 12 to the entry of a notching mechanism 26.

Figure 4:
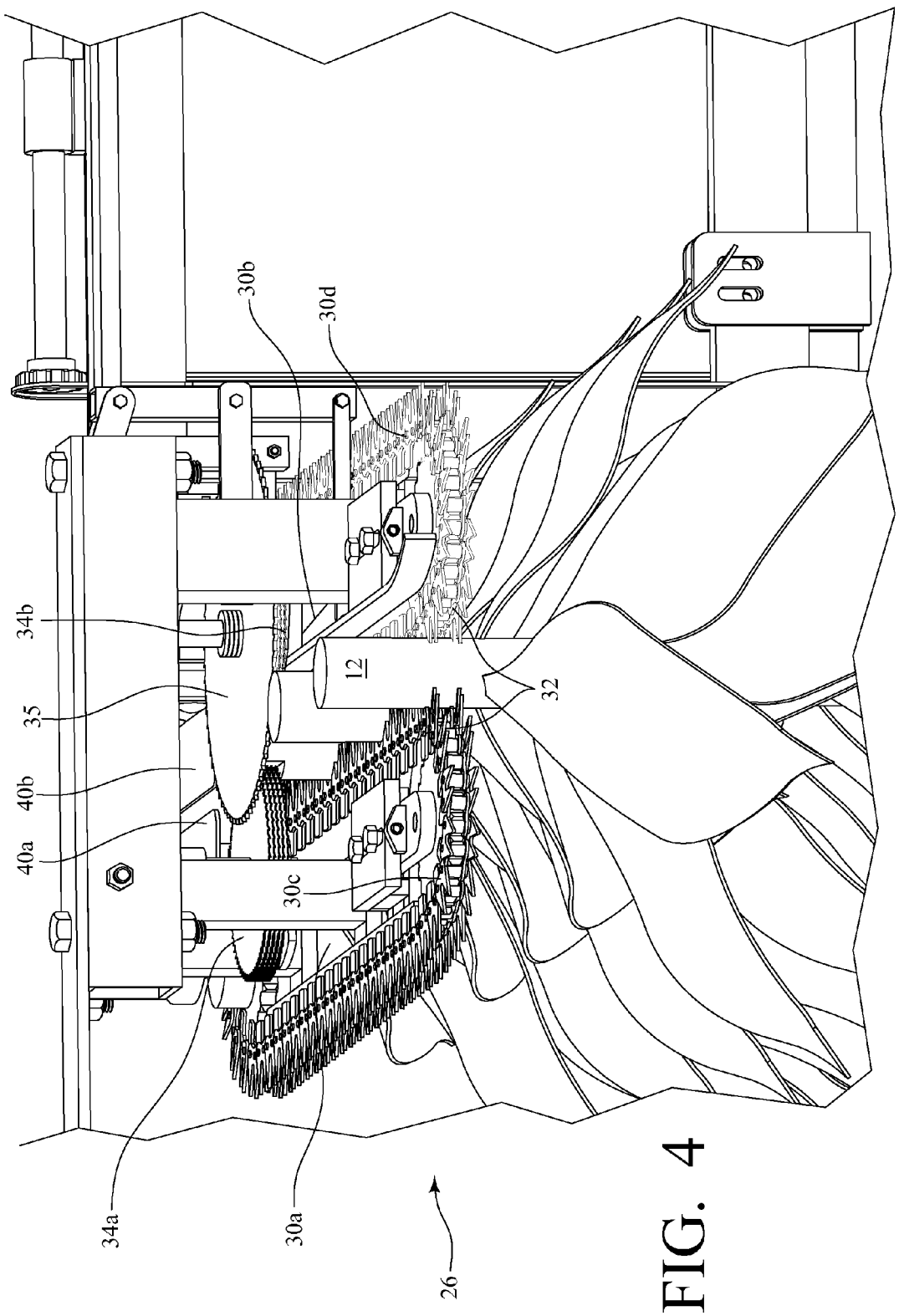
FIG. 4 is a partial perspective view of an embodiment of a notching mechanism of the tobacco harvesting mechanism of FIG. 1.
Figure 5:
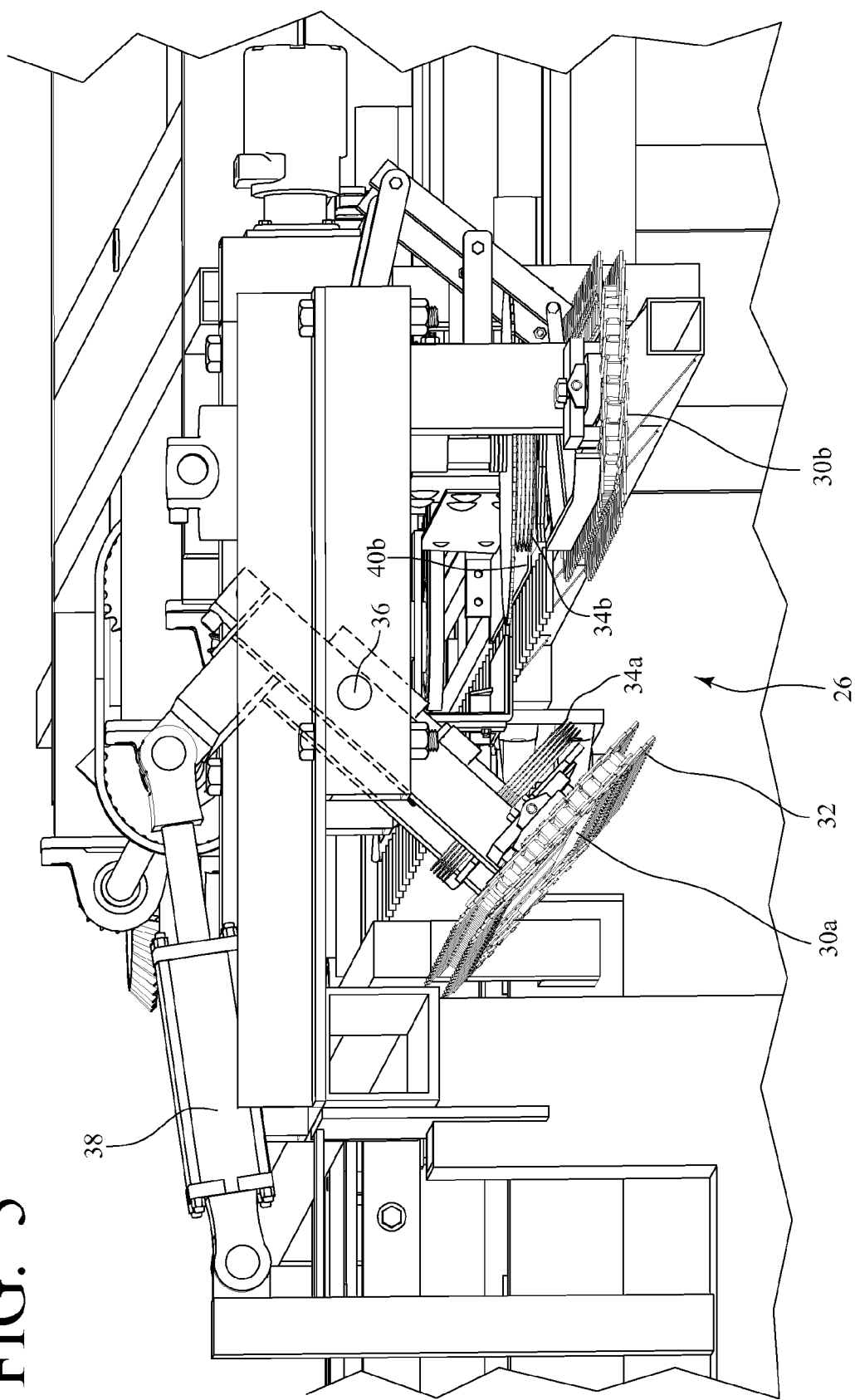
FIG. 5 is a partial perspective view of the notching mechanism of FIG. 4, showing one of the notching conveyors pivoting.

FIG. 4 and FIG. 5 show the notching mechanism 26. As shown in FIG. 4, inverted plants 12 are transferred by the guide 24 and rotating disk 22 into the notching mechanism 26 consisting of opposing notching conveyors 30a, 30b having opposing roller chains 30c, 30d whose links 32 penetrate and grasp the plants 12. A portion of the plant stalk extending above the opposing roller chains 30c, 30d passes between two stacks of rotating blades 34a, 34b which cut notches 14a, 14b into the plant 12 on opposite sides of the stalk near the base. Further, a top-off blade 35 cuts a portion of the stalk above where the notches 14a, 14b are cut.

As illustrated in FIG. 5, one of the opposing notching conveyors 30a of the notching mechanism 26 pivots with respect to a fulcrum 36. A linear actuator means 38, which can include any type of actuator (hydraulic, electric, or pneumatic) and in this case, is a hydraulic cylinder 38, attached to one of the opposing notching conveyors 30a causes one of the opposing notching conveyors 30a to pivot. Pivoting one of the opposing notching conveyors 30a facilitates removal of debris or obstructions from the plants 12 which can accumulate in the notching mechanism 26 and cause malfunction.

Figure 12:
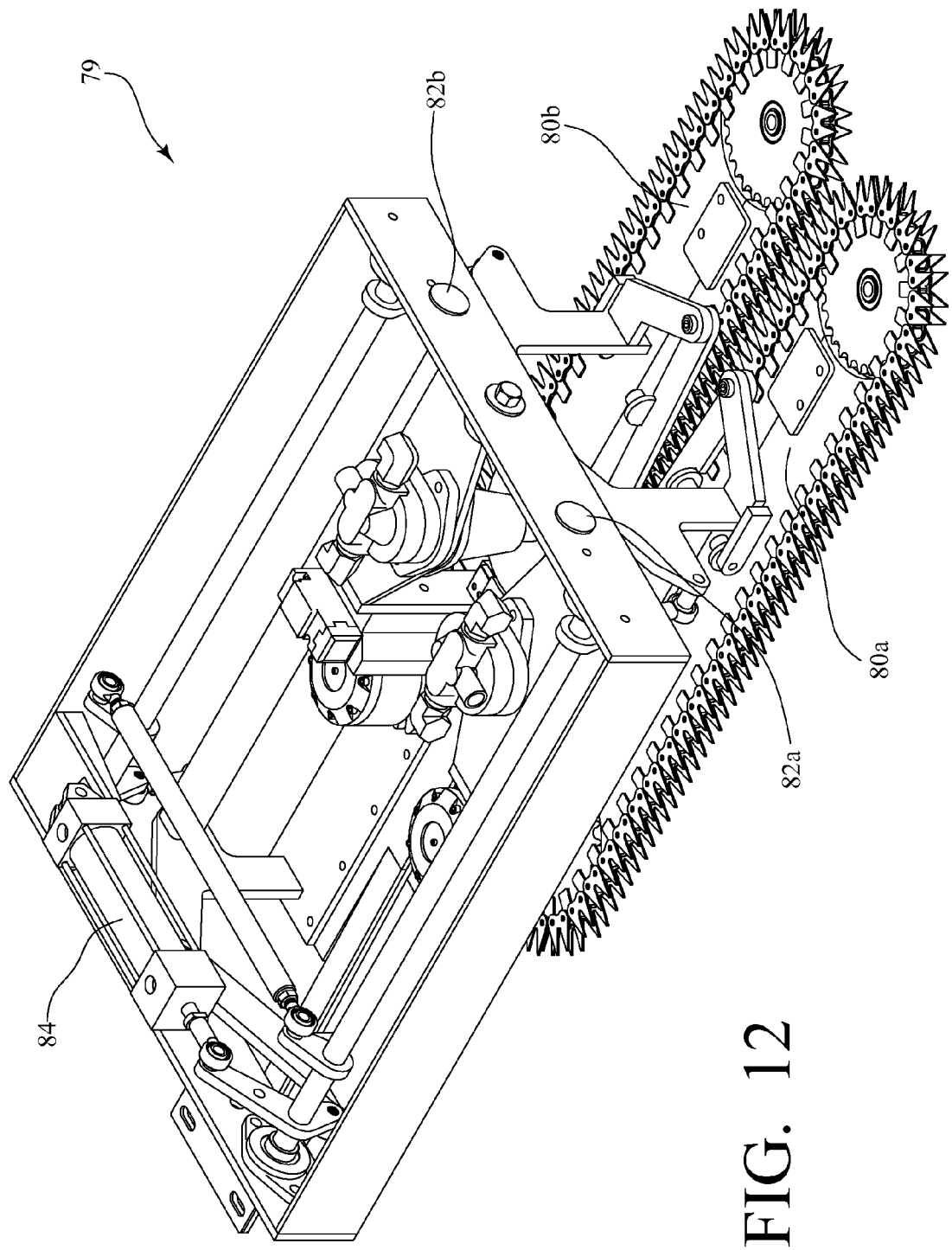
FIG. 12 is a partial perspective view of another embodiment of a notching mechanism and filled rails of the tobacco harvesting mechanism of FIG. 1.
Figure 13:
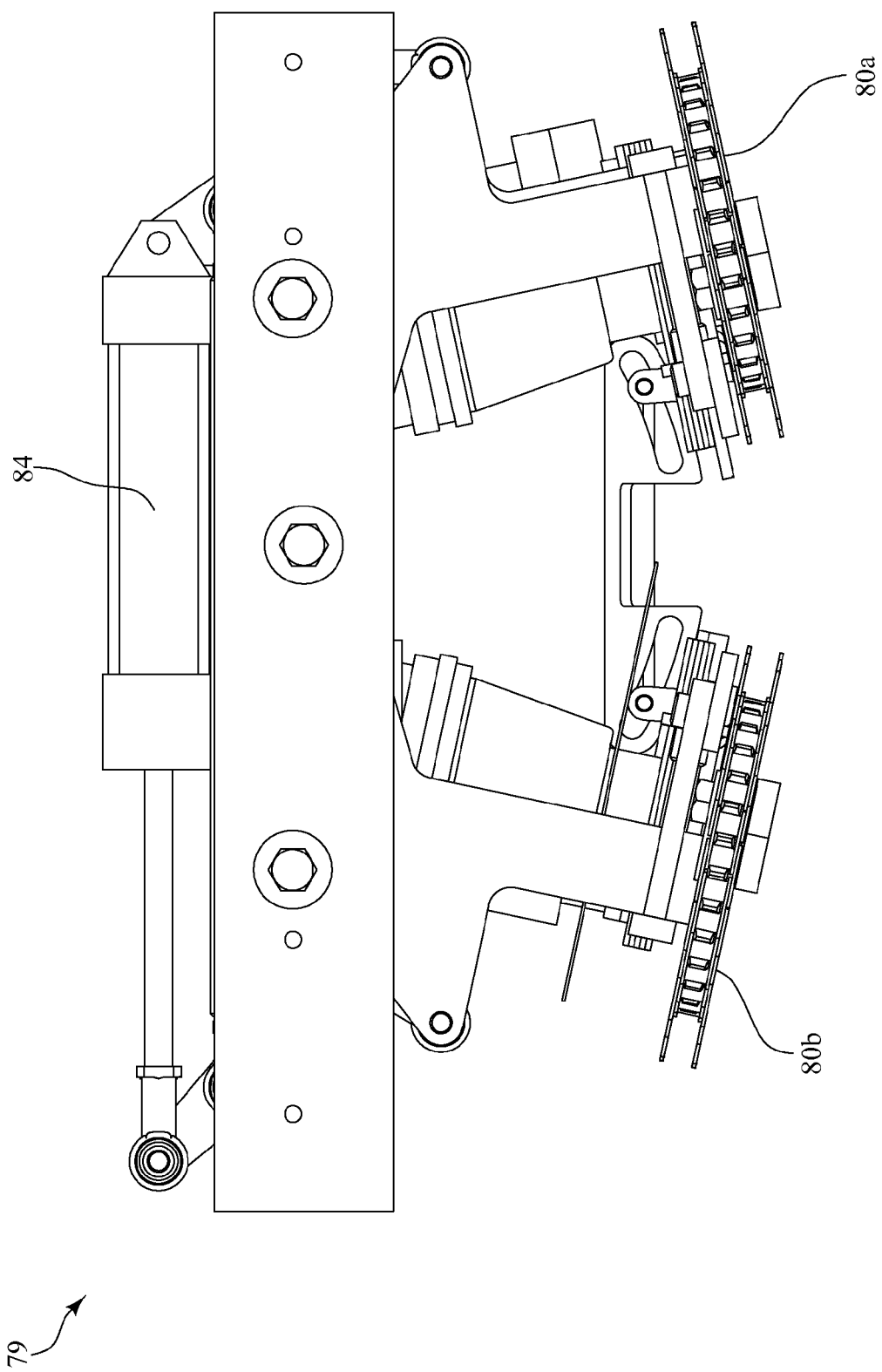
FIG. 13 is a partial perspective view of the notching mechanism of FIG. 12, showing both of the notching conveyors pivoting.

FIGS. 12-13 show another embodiment of the notching mechanism 79. In this embodiment, both of the opposing notching conveyors 80a, 80b pivot on a corresponding fulcrum 82a, 82b by the action of a hydraulic cylinder 84, thereby separating from their normal operational position to facilitate removal of debris or obstructions from the notching mechanism 79. Further, opposing thin members (not shown) which support notched plants as they transfer from the notching mechanism 79 to the rails or receivers 44 are also attached to each of the opposing notching conveyors 80a, 80b so as to pivot and separate with the opposing notching conveyors 80a, 80b. In this embodiment, the improved notching mechanism 79 utilizes separate hydraulic motors (not shown) to drive each of the opposing notching conveyors 80a, 80b via direct coupling to the input shaft of each conveyor 80a, 80b. This embodiment eliminates the necessity of transferring power from one conveyor (80a or 80b) to the other (80b or 80a) via mechanical components such as gears, chains, or belts, thereby making it possible for the conveyors 80a, 80b to be pivoted about the fulcrum 82a, 82b as described.

The following describes the features which accomplish the prescribed function of placing notched plants into slotted rails or receivers for subsequent placement onto supporting structures for curing.

As shown in FIG. 4, the plants 12 are then conveyed to the end of the notching mechanism 26, where the notched plants 12 are inserted between two parallel opposing thin members 40a, 40b spaced apart so as to support the plants 12 by the notches 14a, 14b after the plants 12 exit the notching mechanism 26. Each of the parallel opposing thin members 40a, 40b are preferably operably connected to the opposing notching conveyors 30a, 30b, respectively, such that when one of the opposing notching conveyors 30a pivots, the corresponding thin member 40a will also pivot to facilitate debris removal.

Figure 6:
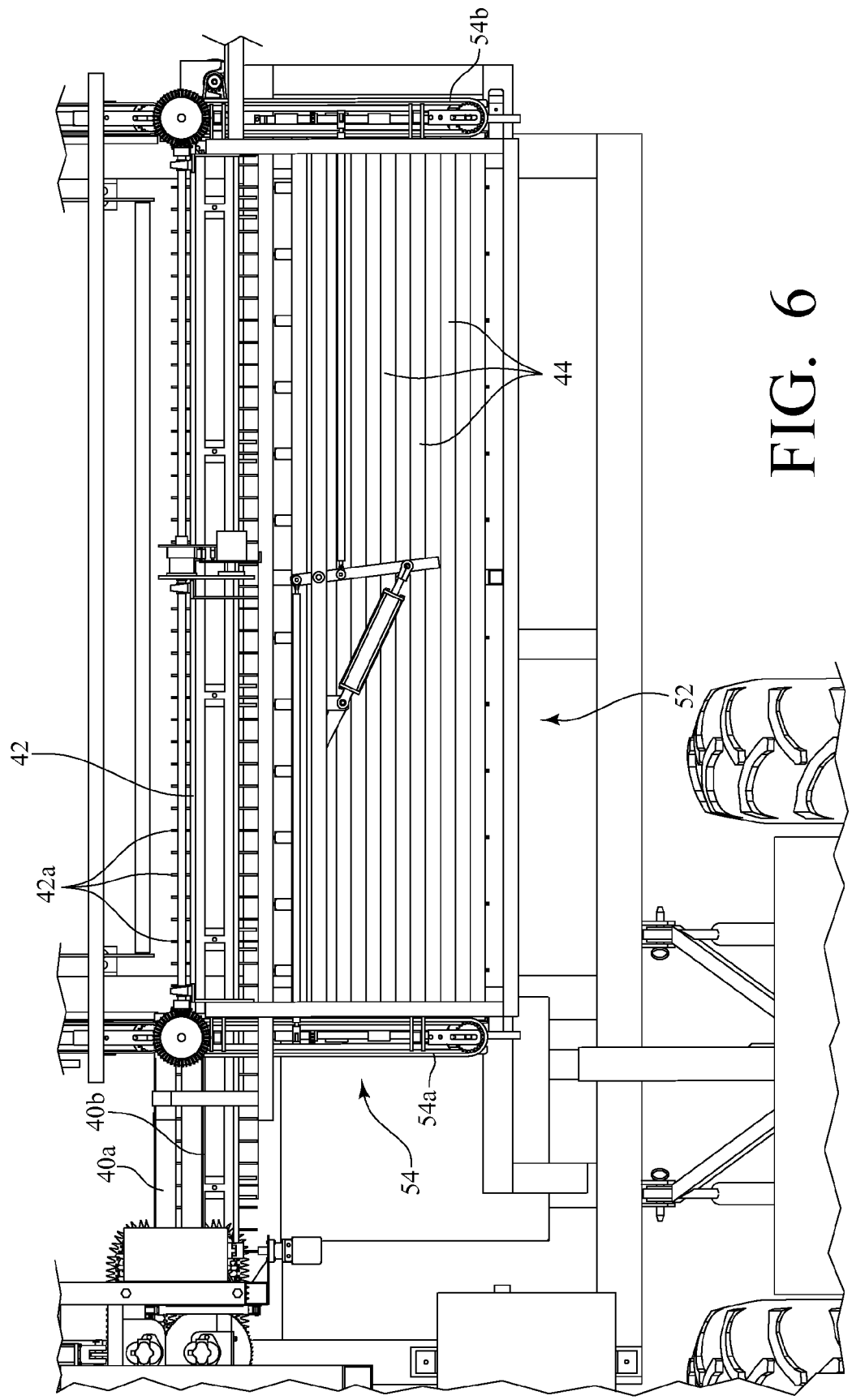
FIG. 6 is a partial top view of the dispensing and unloading conveyors of the tobacco harvesting mechanism of FIG. 1.
Figure 14:
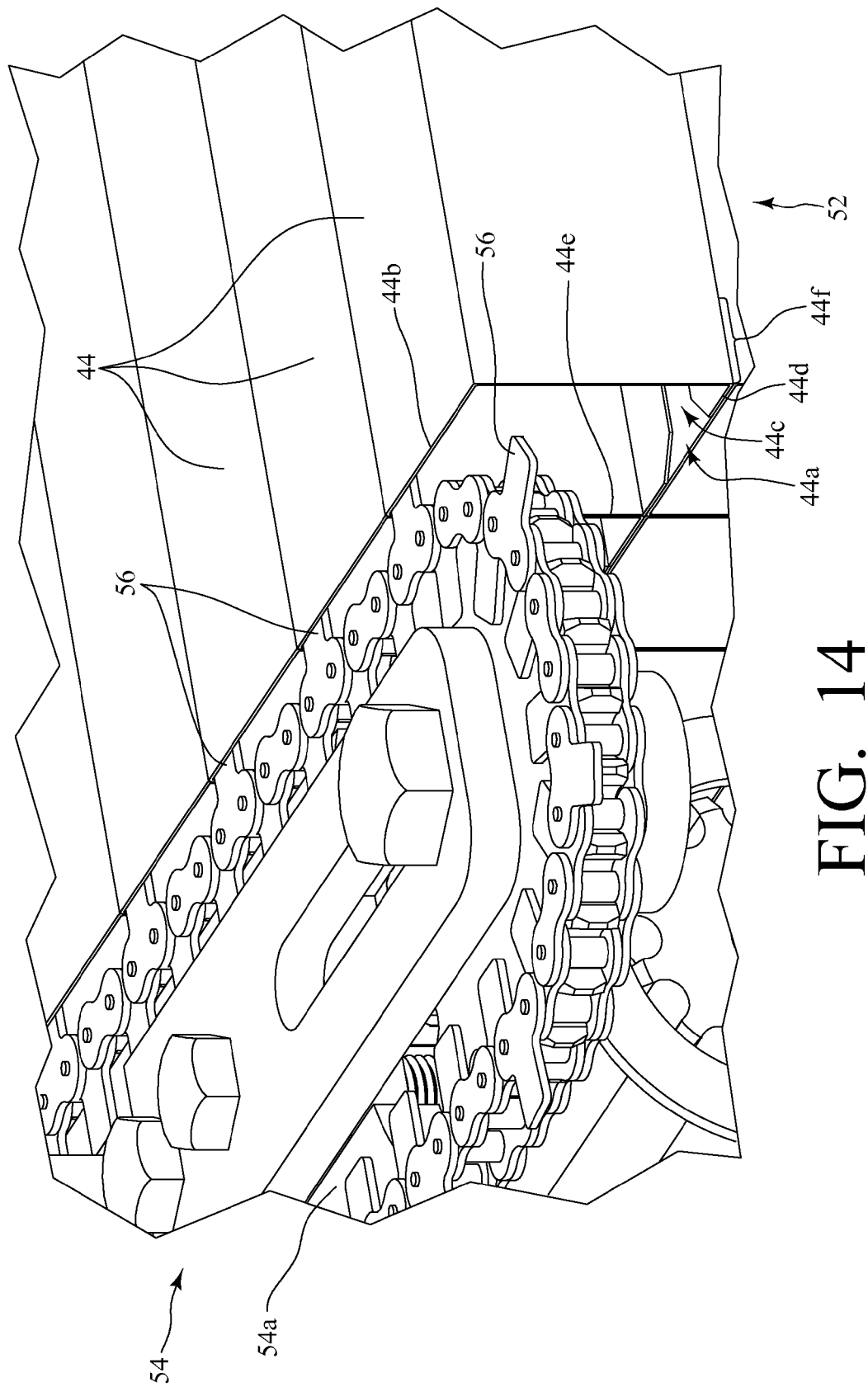
FIG. 14 is a partial perspective view of the dispensing conveyor engaging a top row of rails.
Figure 15:
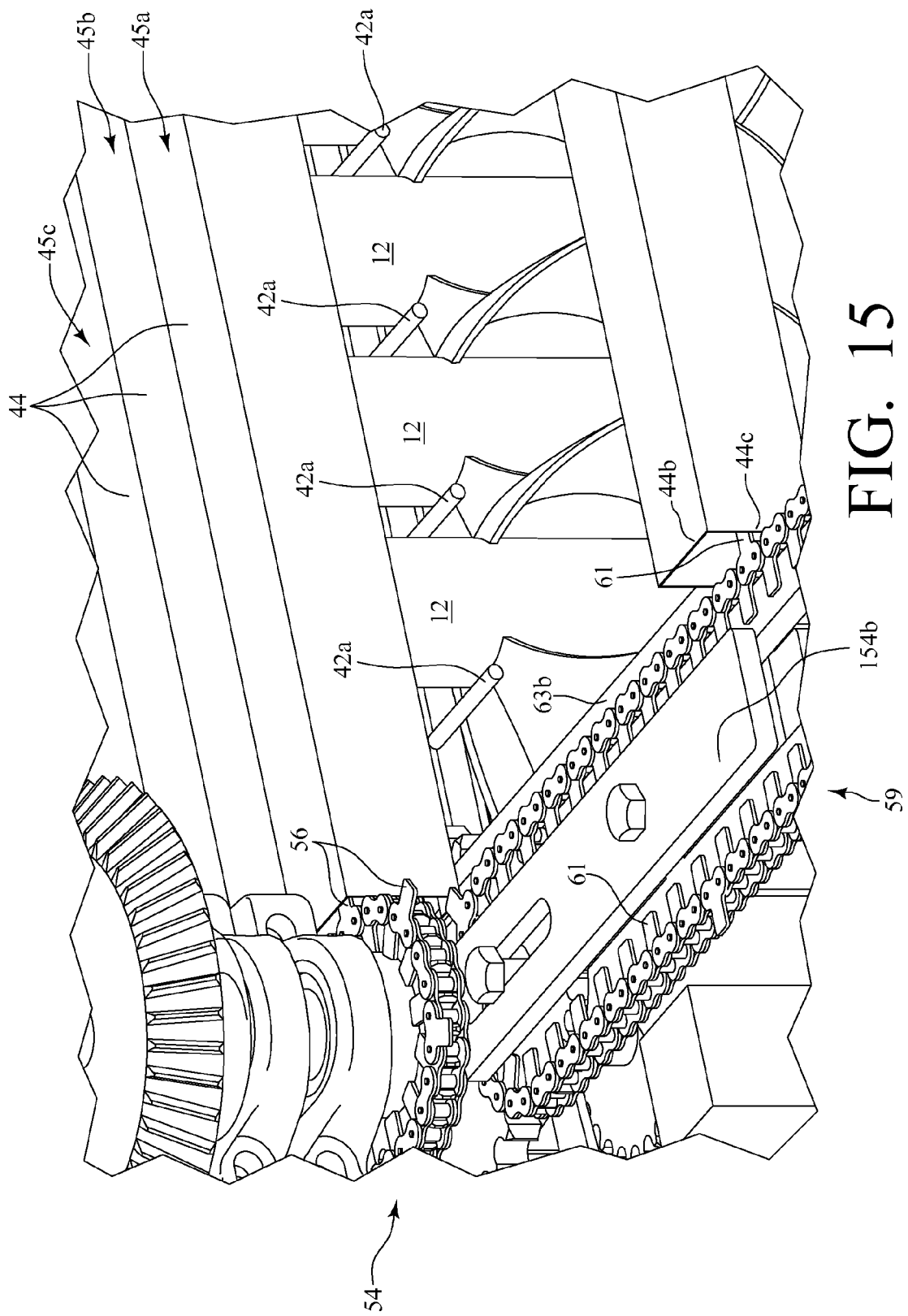
FIG. 15 is a partial perspective view of the dispensing and unloading conveyors of the tobacco harvesting mechanism of FIG. 1.

As shown in FIGS. 6 and 15, the plants 12 travel from the notching mechanism 26 and are then engaged and moved by a single roller chain indexing or stepping conveyor 42 with tine attachments 42a. The tines 42a are attached to the roller chain 43 at a spacing desired between plants within the rails or receivers 44 for curing. As the roller chain 43 rotates, the tines move and push the plants 12 into a rail or receiver 44 into a filling position 45a (shown in FIG. 7), which is in alignment with the stepping conveyor 42 to receive notched plants 12 at the desired spacing between plants over the rail's or receiver's 44 entire length. The tines 42a of the stepping conveyor 42 advance a desired spacing between plants each time a plant 12 exiting the notching mechanism 26 is sensed by an event switch (not shown) located by the exit of notching mechanism 26. The plants 12 enter the rail or receiver 44 via the beveled entry 44a with a portion of the notches 14a, 14b supported by the bottom portion 44d on either side of the slot 44c (as shown in FIG. 14).

Returning now to FIG. 1, two mechanisms handle rails or receivers 44 on the harvester: a rail or receiver magazine 52 and dispensing mechanism 54 stores and dispenses empty rails or receivers 44, and an unloading conveyor 59 accumulates and unloads filled rails or receivers 44.

The rails or receivers 44 are approximately 2 inches square and the base of the rails or receivers 44 with a beveled entry 44a and substantially flat opposing top portions 44b (shown in FIG. 14). The rails or receiver 44 are approximately 10 feet long and has a ⅝ inch wide slot 44c along the entire length of a bottom portion 44d of the rail or receiver 44. Thus, the rails or receivers 44 are elongated and hollow. In this embodiment, the rails or receivers 44 are made of 18 gauge steel. Each rail or receiver 44 can hold approximately 40 tobacco plants. Initially, in this embodiment, there is a rail or receiver 44 in the filling position 45a (best shown in FIG. 7), six rails or receiver 44 in the gap 45b-45h, and fourteen rails or receivers 44 from the top row of the stack of rails or receivers 44.

Figure 7:
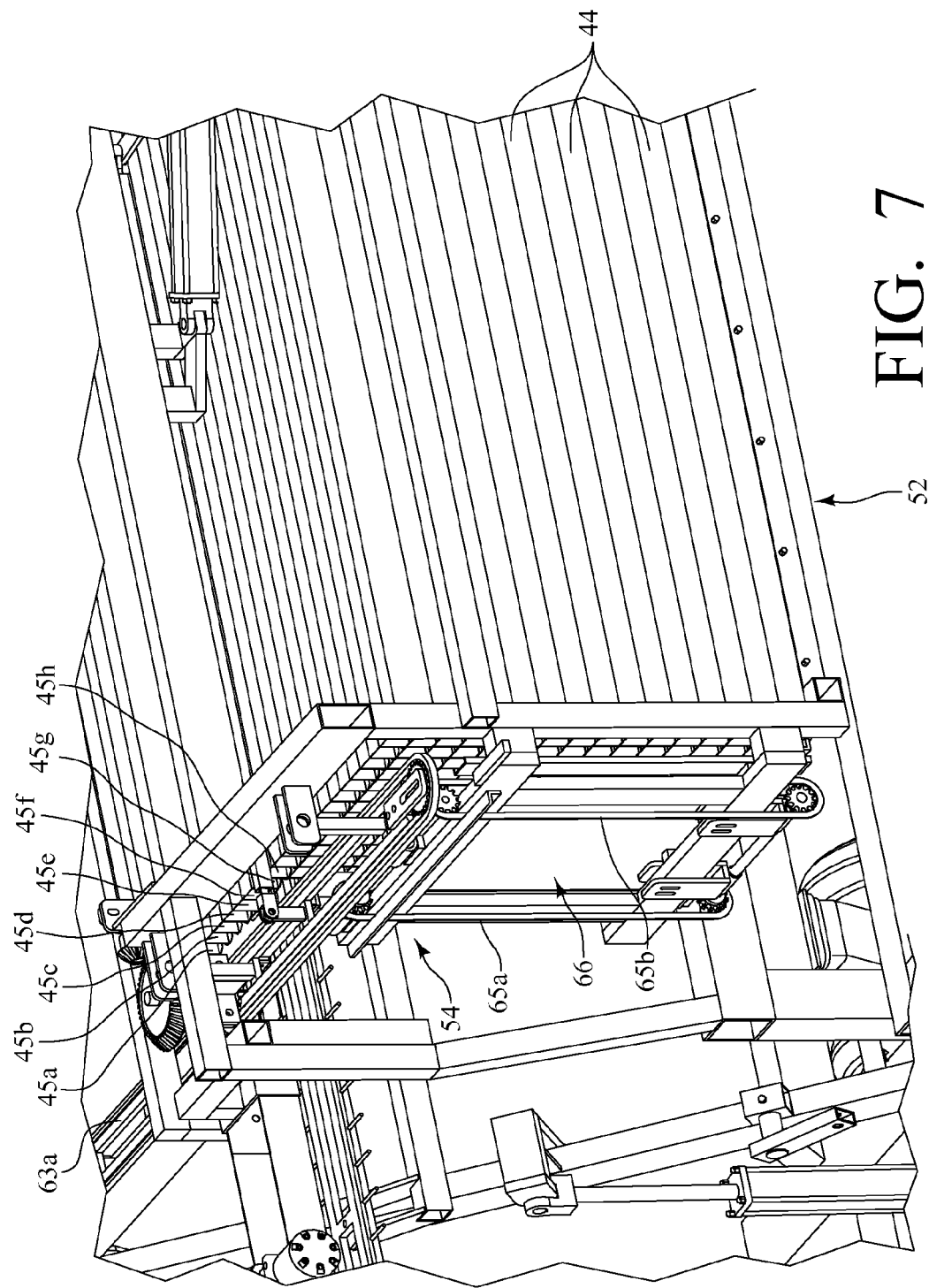
FIG. 7 is a partial perspective view of the unloading and elevating conveyors of the tobacco harvesting mechanism of FIG. 1.

Turning now to FIGS. 6-7 and 14, a 14×14 stack of empty rails or receivers 44 is placed into a magazine 52 of the dispensing mechanism 54. The dispensing mechanism 54 includes opposing dispensing conveyors 54a, 54b with opposing roller chains 54c, 54d having tabs 56 extending from the roller chains 54c, 54d. The tabs 56 are located adjacent to each other tab 56 on a roller chain 54c or 54d at a desired spacing equal to the width of the rails or receivers 44. In this embodiment, the roller chains 54c, 54d are No. 40 (½ inch pitch) chains, with the tabs 56 spaced approximately 2 inches apart from each other. Each opposing tabs 56 on the opposing roller chains 54c, 54d engages the opposing ends 44b of each rail or receiver 44 in the top row of fourteen rails or receivers 44 in the magazine 52, the six rails or receivers 44 in the gap 45b-45h, and the rail or receiver 44 in the filling position 45a.

For the fourteen rails or receivers 44 in the top row of rails or receivers 44, the tabs 56 collectively lift the top row of rails or receivers 44 from the row beneath it to achieve a clearance of approximately ⅛ inch. For the rails or receivers 44 in the gap 45b-45h and the filling position 45a, the tabs 56 collectively lift the rails or receivers 44 from a support rail (not shown in FIGS. 7 and 14) beneath the rails or receivers 44 to achieve a clearance of approximately ⅛ inch.

The dispensing mechanism 54 transports empty rails or receivers 44 from the top row of the magazine 52 to the gap 45b-45h and eventually to the filling position 45a by advancing the rails or receivers 44 an increment equal to the width of a rail or receiver 44. The advancement causes the rails or receivers 44 in the gap 45b-45h to also advance an increment equal to the width of a rail or receiver 44. Thus, the rail or receiver 44 in the gap position 45b, which is adjacent to the filling position 45a, is advanced to the filling position 45a. This advancement occurs when a plant 12 reaches near the end portion (not shown) of a rail or receiver 44 in the filling position 45a and activates an event switch (not shown) located near the end portion (not shown) of the rail or receiver 44 in the filling position 45a. Once a rail or receiver 44 is completely filled with plants 12, the dispensing mechanism 54 advances the rail or receiver 44 in preparation for unloading.

Figure 9:
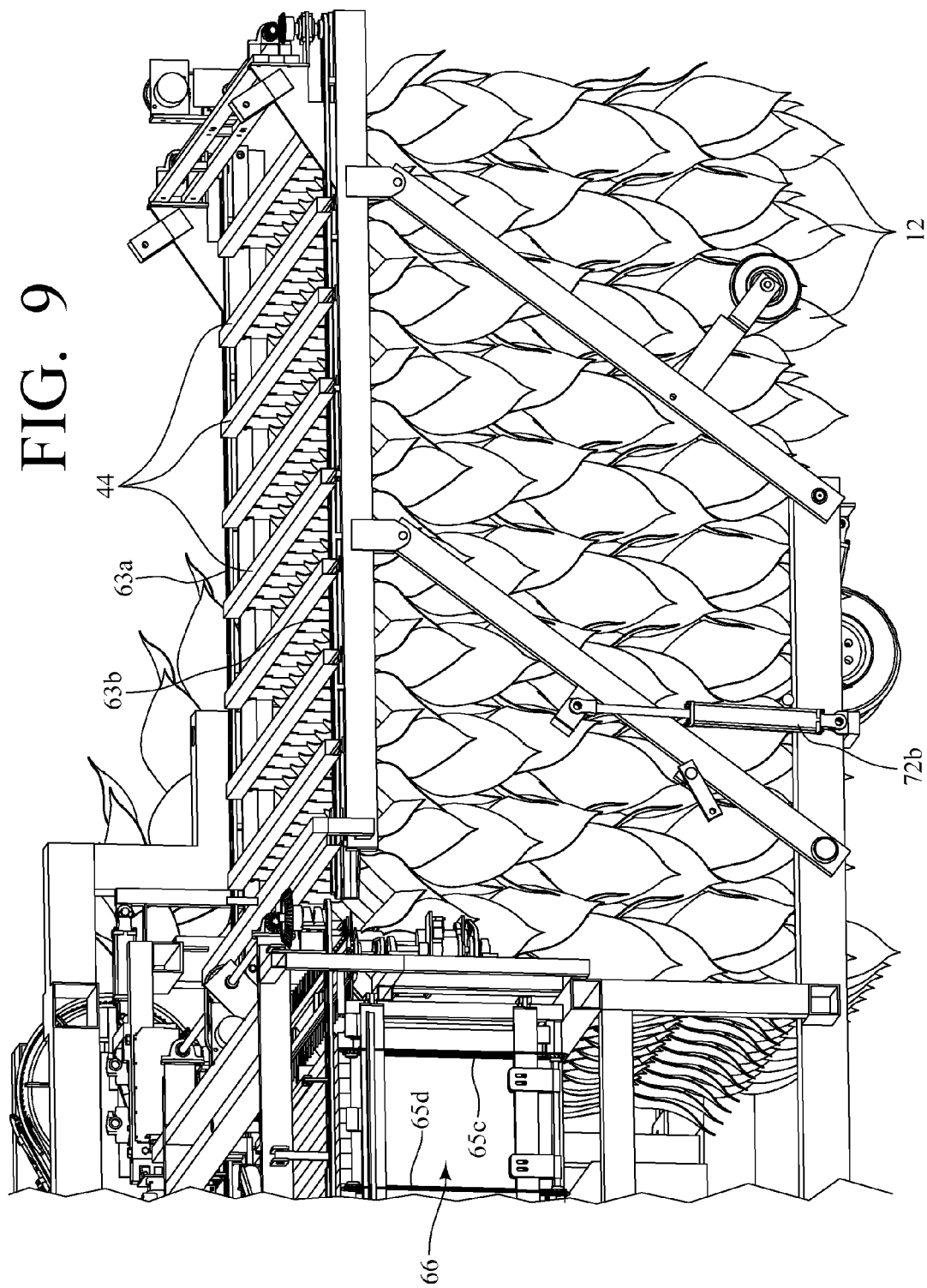
FIG. 9 is a partial perspective view of the unloading conveyor and filled rails of the tobacco harvesting mechanism of FIG. 1.

As shown in FIGS. 9 and 15, closure of the event switch (not shown), located near the end portion (not shown) of the rail or receiver 44 in the filling position 45a, simultaneously activates opposing roller chains 154a (not shown), 154b (shown in FIG. 15) with tabs 61 on the unloading conveyor 59. The opposing roller chains 154a, 154b (pivot and inserts the tabs 61 into the side portions 44e of the rail or receiver 44 that was advanced by the dispensing mechanism 54 from the filling position 45a. The spacing between these tabs 61 is equal to the desired separation between filled rails or receivers 44 for handling, transporting, and curing the plants 12, which is, in this case, approximately 12 inches.

Figure 8:
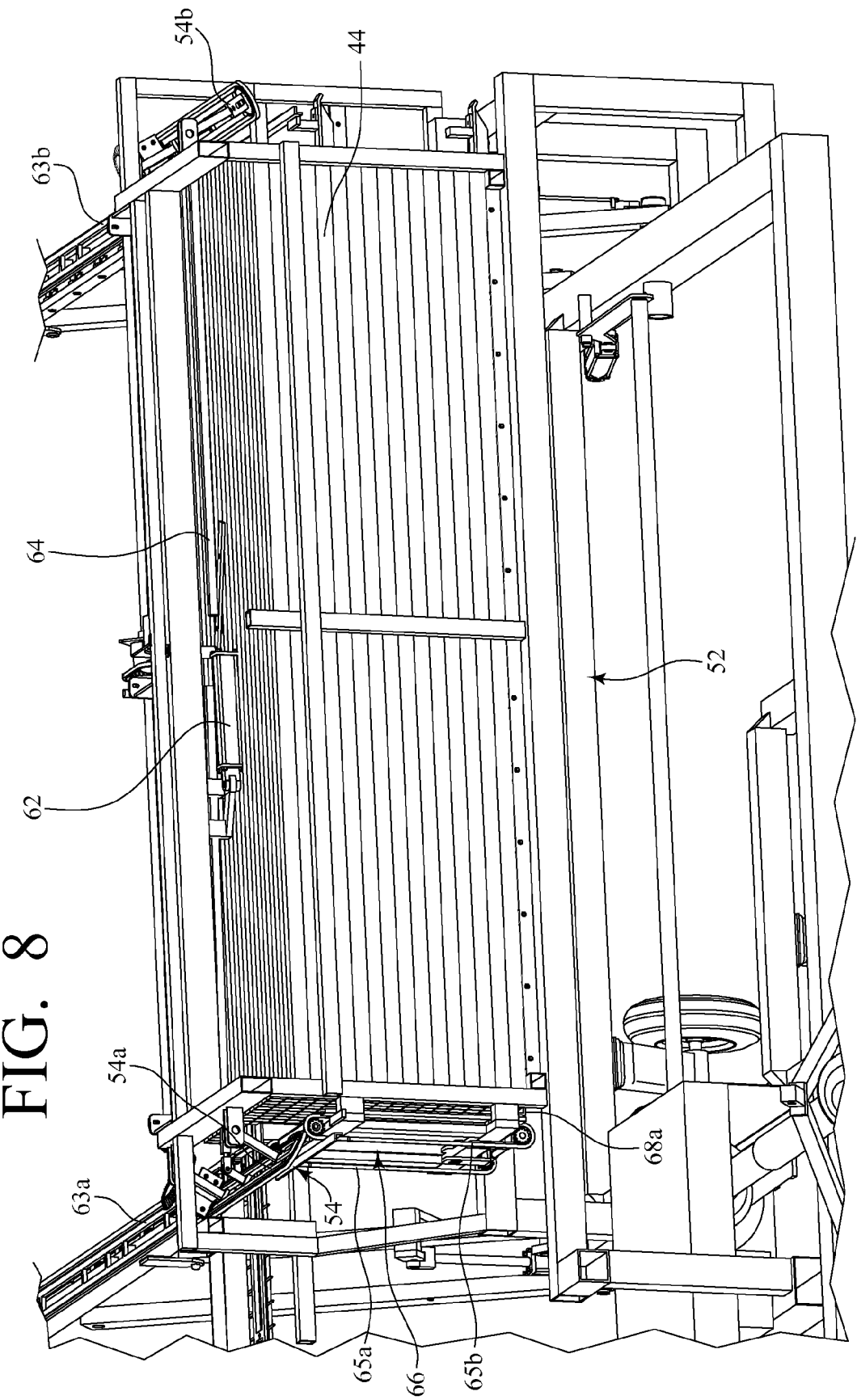
FIG. 8 is another partial perspective view of the unloading and elevating conveyors of the tobacco harvesting mechanism of FIG. 1, showing the unloading conveyors pivoting.

When a row of fourteen rails or receivers 44 has been advanced past or removed from the top row of the magazine 52, an event switch (not shown) near gap position 45h is tripped, causing a hydraulic cylinder 62 and linkage 64 to pivot outward so the opposing dispensing conveyors 54a, 54b pivot outward and disengage from the rails or receivers 44. Next, the paired roller chains 65a, 65b of the opposing elevating conveyors 66a (far end of the paired roller chains 65c, 65d and the other elevating conveyor 66b not visible in FIG. 8), oriented vertically and joined by a solid member 68a, the solid member 68a having a substantially flat portion that supports the magazine 52 of rails or receivers 44 on each opposing magazine bottom end portions or the bottom portions 44d of the bottom row of rails or receivers 44 (far end of member 68b not visible in FIG. 8), lifts the stack of empty rails or receivers 44 within the magazine 52 up a distance equal to the height of one row of the rails or receivers 44 (approximately 2 inches).

The opposing dispensing conveyors 54a, 54b then begin to pivot inward, inserting the tabs 56 into the open ends of the rails or receivers 44. The tabs 56 enter the rails or receivers 44 on the top portion 44b of the rails or receivers 44. The dispensing mechanism 54 continue to pivot to a final substantially horizontal position, with the last few degrees of rotation allowing the tabs 56 to slightly lift the rails or receivers 44 from the stack of rails or receivers 44 immediately below the rails or receivers 44, so that they can be conveyed without resistance. The event switch near gap position 45h and a clutch (not shown) control the advancement of the elevating conveyor 66 and also the engagement of the top row of rails or receivers 44 by the dispensing mechanism 54.

Moving now to FIGS. 9 and 14-15, the unloading conveyor 59 engages the filled rails or receivers 44 in a similar manner as the dispensing mechanism 54. In this embodiment, No. 40 roller chains are used. In the unloading conveyor 59 the tabs 61 are spaced approximately 12 inches apart from each other. Each opposing end portion 44f, (other end portion not shown) of the filled rail or receiver 44 rests on and is supported by a corresponding track 63a, 63b made of UHW polyethylene or other suitable material. The tabs 61 extend inside and on the side portion 44e of the rails or receivers 44 and push the rails or receivers 44 rearward along the tracks 63a, 63b. When the desired number of filled rails or receivers 44 (ten in this embodiment) for handling and/or curing have been accumulated in the unloading conveyor 59, the event switch (not shown) located near the end of the track 63b is tripped, initiating the unloading sequence. First, the paired hydraulic cylinders 72a, 72b that support the unloading conveyor support members 76a, 76b begin to retract.

Figure 10:
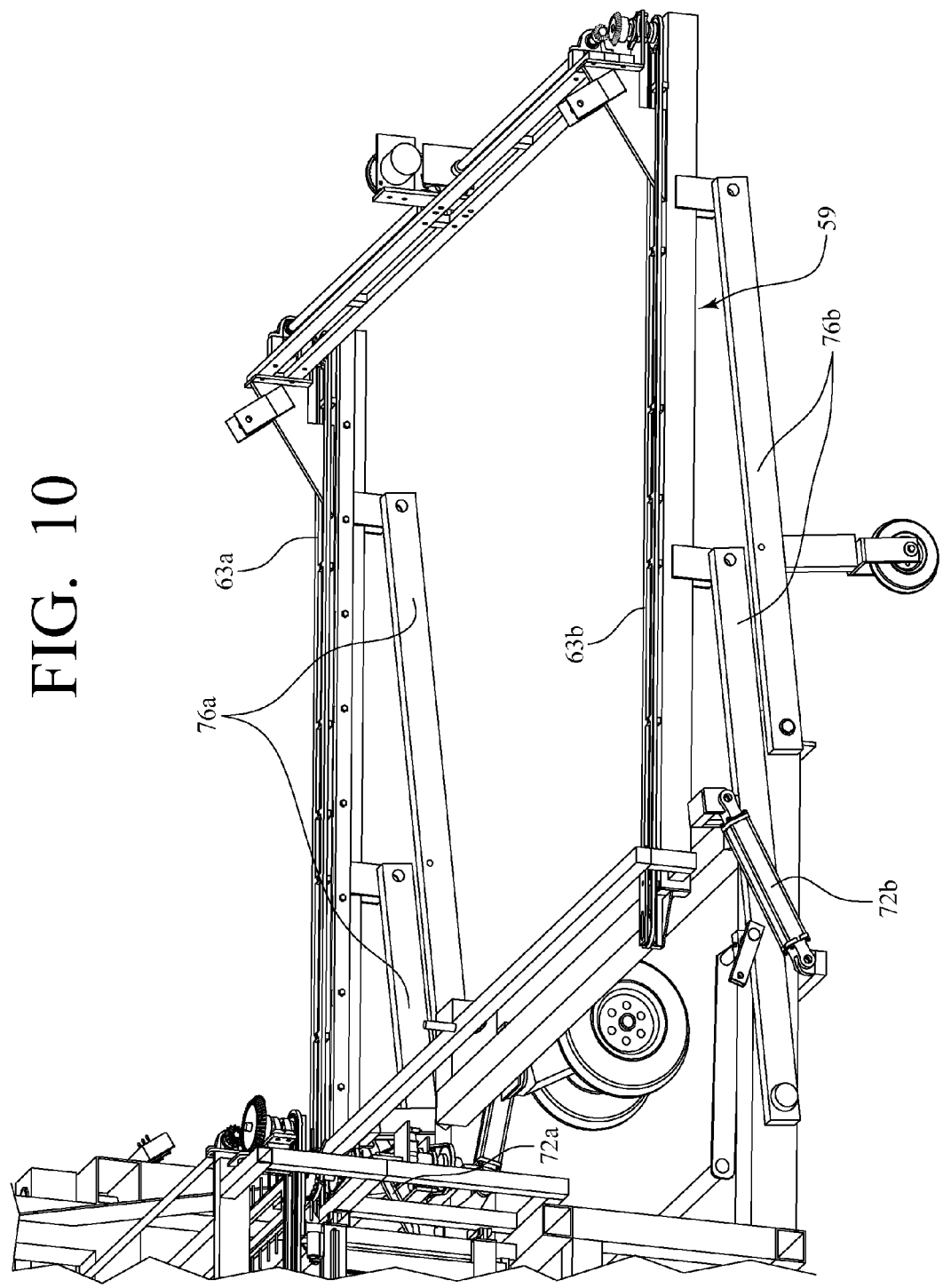
FIG. 10 is another partial perspective view of the unloading conveyor of FIG. 9, showing the unloading conveyor after unloading the filled rails of tobacco plants.

As shown in FIG. 10, this retraction pivots the unloading conveyor support members 76a, 76b rearward and lowers the unloading conveyor 59. When the lower portions of the plants 12 in the filled rails or receivers 44 begin to reach the ground, a clutch (not shown) causes the unloading conveyor 59 to operate at a linear speed approximately equal to the forward speed of the harvesting mechanism 10. The unloading conveyor 59 continues to operate until all the filled rails or receivers 44 have been unloaded off the tracks 63a, 63b and the rails or receivers 44 and plants 12 are laid on the ground. Another event switch (not shown) located near the end of the tracks 63a, 63b detects when all the filled rails or receivers 44 on the tracks 63a, 63b have been unloaded from the unloading conveyor 59 after the unloading sequence has been initiated. This signals the cylinders 72a (not shown in FIG. 10), 72b to extend and raise the unloading conveyor 59 back to the filling position before the next rail or receiver 44 in the filling position 45a is filled.

Figure 11:
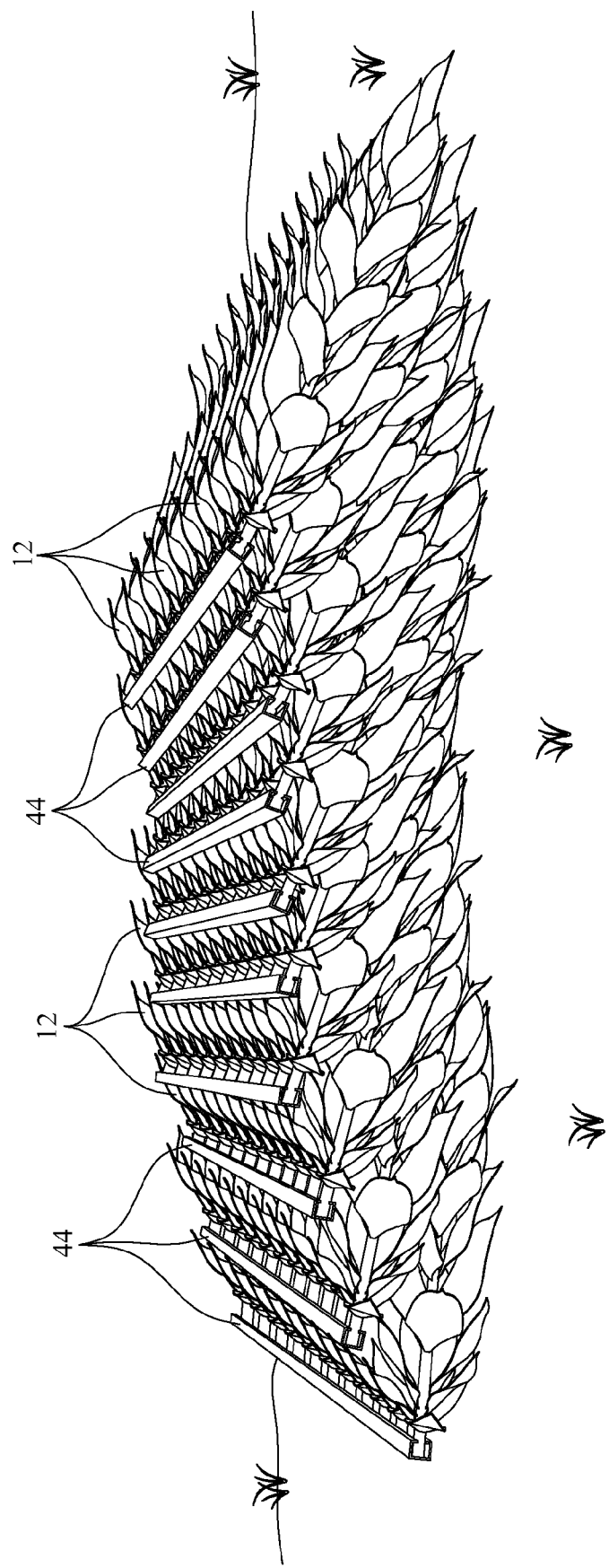
FIG. 11 is a perspective view of the unloaded filled rails of tobacco plants.

FIG. 11 shows the placement of the filled rails or receivers 44 and plants 12 on the ground in a configuration suitable for subsequent engagement by a transport device, towed by a tractor or other propulsion device. This placement results from the simultaneous rearward and downward movement of the filled rails or receivers 44. Thus, the unloading conveyor 59 receives rails or receivers 44 filled with plants that are advanced by the two opposing dispensing conveyors 54a, 54b, collects a group of filled rails or receivers 44, and unloads the group of filled rails or receivers 44 on a ground level.

In operation, harvesting the tobacco plants with the harvesting mechanism 10 includes loading a magazine 52 of rails or receivers 44. Next, one of the rails or receivers 44 is dispensed to a filling position 45a by two opposing dispensing conveyors 54a, 54b, each engaging each of the opposing ends of a plurality of rails or receivers 44 from the magazine 52 of rails or receivers 44. Then, a plurality of tobacco plants 12 is loaded into one of the rails or receivers 44 at the filling position 45a. Then, a loaded rail or receiver 44 is collected in an unloading conveyor 59. Then, the harvesting mechanism continues to dispense one of the rails or receivers 44 to the filling position 45a, to load tobacco plants 12 into one of the rails or receivers 44 at the filling position 45a, and to collect loaded rails or receivers 44 in the unloading conveyor 59, until a desired number of loaded rails or receivers 44 have been collected. Finally, the desired number of collected loaded rails or receivers 44 is unloaded to a ground level.

Further, the tobacco plants 12 are cut with notches 14a, 14b on opposing sides of the tobacco plants 12 prior to loading the plurality of tobacco plants 12 into one of the rails or receivers 44 at the filling position 45a, and one of the opposing notching conveyors 30a are pivoted with respect to a fulcrum 36 to facilitate debris removal.

The abovementioned conveyors and mechanisms of the harvesting mechanism 10 are driven by hydraulic motors and cylinders. Electric spring wrap clutches are used to engage and disengage the stepping conveyor, the dispensing conveyor, the unloading conveyor and the magazine elevating conveyor. Electric solenoid position control valves are used to extend and retract hydraulic cylinders. Event switches are standard event switches and are not, per se, part of the invention.

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:
1. A harvesting mechanism for harvesting tobacco plants, the harvesting mechanism comprising:
   a magazine of rails, each rail being elongated and hollow, with a slot along a bottom portion of the rail, and opposing ends;

two opposing dispensing conveyors each engaging each opposing end of each rail in a top row of rails from the magazine of rails for advancing an empty rail to a filling position;

two opposing notching conveyors, each of the opposing notching conveyors having links for grasping the plants, and each of the opposing notching conveyors having a stack of rotating blades for cutting notches into the plants on opposing sides of the plant;

a single roller chain stepping conveyor with tine attachments for moving the plants from the opposing notching conveyors into a rail in the filling position in alignment with the single roller chain stepping conveyor;

wherein the two opposing dispensing conveyors advance the rail filled with plants; and an unloading conveyor having opposing roller chains for receiving rails filled with plants advanced by the two opposing dispensing conveyors, for collecting a group of filled rails, and for unloading the group of filled rails on a ground level at a linear speed equal to a forward speed of the harvesting mechanism.

2. The harvesting mechanism for harvesting tobacco plants of claim 1, wherein one of the opposing notching conveyors pivots with respect to a fulcrum to facilitate debris removal and wherein a linear actuator means cause one of the opposing notching conveyors to pivot with respect to the fulcrum.

3. The harvesting mechanism for harvesting tobacco plants of claim 2, wherein the linear actuator means is a hydraulic assembly.

4. The harvesting mechanism for harvesting tobacco plants of claim 2, wherein the other of the opposing notching conveyors pivots with respect to another fulcrum.

5. The harvesting mechanism for harvesting tobacco plants of claim 1, further comprising two parallel thin members spaced apart and one of the two parallel thin members being operably connected to the one of the opposing notching conveyors for supporting the plants after the plants exit the opposing notching conveyors, the one of the two parallel thin members pivoting with the one of the opposing notching conveyors.

6. The harvesting mechanism for harvesting tobacco plants of claim 1, wherein the magazine has opposing magazine bottom end portions and further comprising an elevating conveyor having opposing pairs of vertical roller chains each joined by a solid member which supports each bottom end of the magazine of rails, wherein when a row of rails has been removed from the top of the magazine of rails, the two opposing dispensing conveyors pivot outward, the elevating conveyor lifts the magazine of rails a distance equal to a height of one row of rails, and the two opposing dispensing conveyors pivot inward to engage each end of each rail in the top row of rails.

7. The harvesting mechanism for harvesting tobacco plants of claim 6, wherein the dispensing conveyor lifts the top row of rails from the row of rails beneath the top row of rails.

8. The harvesting mechanism for harvesting tobacco plants of claim 1, wherein the harvesting mechanism is mounted to and propelled by a tractor.

* * * * *